3,666,503
INKS CONTAINING NAPHTHYL-AZO-α-HYDROXY-NAPHTHOIC ACID PIGMENTS AND METHOD
Frank P. Dombroski, Scotch Plains, N.J., assignor to American Cyanamid Company, Stamford, Conn.
No Drawing. Continuation-in-part of application Ser. No. 640,820, May 24, 1967, now Patent No. 3,520,870, dated July 21, 1970. This application June 22, 1970, Ser. No. 48,520
Int. Cl. C09d *11/08*
U.S. Cl. 106—30
4 Claims

ABSTRACT OF THE DISCLOSURE

The calcium, barium, and strontium salts of the azo compound obtained by coupling 2-naphthylamine-1-methylsulfonic acid with beta-hydroxynaphthoic acid are pigments of a desirable and unusual shade of maroon with excellent properties as to strength, gloss, transparency, etc., and form ink formulations which have superior storage stability.

The pigments are thought to be properly named as the calcium, barium or strontium salts of 2-(3'-carboxy-2'-hydroxy - 1' - naphthyl) azo-naphthyl-1-methylsulfonic acid, or mixtures thereof.

Wood rosin and/or other conditioning treatments are preferred.

CROSS REFERENCES

This application is a continuation-in-part of Ser. No. 640,820, May 24, 1967, now U.S. Patent 3,520,870, July 21, 1970 Naphthyl-Azo-α-Hydroxy-Naphthoic Acid Pigments.

SUMMARY OF THE INVENTION

This invention relates to maroon colored organic pigment in an ink formulation and to methods of preparing the pigments.

Colored pigments for use in printing ink compositions must meet certain requirements with respect to solubility characteristics, shade, tone, strength of color, stability, etc. A primary requirement is for a good clean shade of color. In addition, there are requirements as to light fastness. In alcoholic flexographic ink compositions, it is necessary that standards be met with respect to color strength, shade, transparency, particle size, light stability and storage stability. Thus, for example, there should be no deterioration on storage and there should be no change in color shade or loss of strength. In addition, the formulation containing the pigment should not gain in viscosity, i.e., there should be no tendency for the ink to "body." It is the major object of this invention to provide pigment compositions which by virtue of desirable shade and properties form useful ink formulations. Other objects will be apparent from the ensuing description of this invention.

The present invention is based on the discovery that specific metallic salts of a certain azo compound as defined below, provide improved pigments of desirable and unusual shade of maroon with improved properties as to strength, gloss, transparency, etc. In addition, these pigments afford compositions which are of superior storage stability. These may be formed by usual and conventional coupling and neutralization procedures known in the art.

The pigments of this invention are metal salts of the azo compound obtained by coupling 2-naphthylamine-1-methyl-sulfonic acid with beta-hydroxy-naphthoic acid. They may be represented by the Formula I:

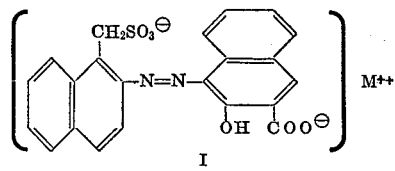

wherein M is a calcium, barium or strontium cation. The present invention contemplates mixtures of any two or more salts of Formula I.

It is surprising that the pigments of this invention have such desirable properties, since various types of azo pigments, even those of related structures in the form of the metallic salts, do not afford properties comparable to those of the improved pigments of the invention. Thus, for example, the azo pigments derived from 2-naphthylamine-1-methylsulfonic acid coupled with beta-naphthol in the form of metallic salts are known, but they do not show the superior properties of those of the pigments of the invention. Likewise, the azo compound formed by coupling 2-amino-1-naphthalene sulfonic acid (Tobias acid) with beta-hydroxynaphthoic acid, in the form of metallic derivatives, are not comparable with the pigments of the invention. It is further noted that the superior properties of the pigments of this invention are not generally possessed by all metal salts, but are specifically found in the calcium, barium or strontium salts or mixtures thereof described above. Thus, for example, the manganese salt of the same azo product used herein does not have the same desirable properties as the specific salts of this invention.

Advantageously, conditioning steps or end treatments such as are normally applied in the art to pigments for various purposes are also useful in preparing the improved pigments of this invention. Such known conditioning procedures generally involve forming and/or heating a suspension of the pigment in an aqueous system in the presence of certain treating agents, such as aluminum chloride, optionally with added sodium chloride, aluminum acetate, zinc acetate or a basic solution of wood rosin.

In some instances it is preferred to carry out the coupling step in the presence of a conditioning agent such as for example wood rosin (abietic acid).

The pigments of this invention are prepared by conventional coupling procedures from 2-naphthylamine-1-methylsulfonic acid and beta-hydroxy-naphthoic acid (BON). It should be noted that 2-naphthylamine-1-methylsulfonic acid is the commonly used designation for the starting material intended here. However, as noted in Beilstein vol. 14, page 770 there may be some question as to the exact structure of this product. The name used herein is intended to designate the naphthalene derivative obtained by reaction of beta-naphthol with formaldehyde and sodium sulfite, with subsequent treatment with ammonium sulfite and ammonia at elevated temperature. The coupled product is then converted to the desired metallic salt and optionally given one of various end treatments described above.

The calcium salt of Formula I is preferred. However, in some instances other salts or combinations of one or more of the salts may be used to achieve a particularly desirable property such as specificity of shade or particle size or improved strength. Thus, in a preferred composition of this invention, a combination of the calcium salt with a small percentage of the strontium salt is used to give a pigment of very desirable shade.

The pigments of the invention are used in conventional printing ink compositions as are well-known in the art. These include alcoholic and aqueous flexographic inks, rotogravure and nitrocotton shellac flexographic inks.

This invention is further illustrated by the following examples in which parts and percentages are on a weight basis unless otherwise stated.

Example 1

To a solution of 31 parts of sodium hydroxide in 1361 parts of water is added 160 parts of 2-naphthylamine-1-methyl sulfonic acid. After stirring at 25° C. until solution is complete, ice is added to bring the temperature to 0° C., bringing the total mixture to 4242 parts. Then an aqueous solution of 46.5 parts of sodium nitrite is added followed by 68 parts of hydrochloric acid. The diazotization is completed by continuing to stir at 0° C. A solution of beta-hydroxynaphthoic acid (BON) is separately prepared. For this purpose 135 parts of BON is added to 74 parts of sodium hydroxide in 3068 parts of water. After stirring at 25° C. until solution is complete, a small amount of a dispersing agent is added and the solution is then made up to a total of 6543 parts by the addition of ice, bringing the temperature to 0° C. The diazo suspension is then added rapidly to the BON solution and the mixture is stirred at about 0° C. until coupling is complete.

After an additional stirring period, a solution of 190 parts calcium chloride and 7.5 parts of strontium nitrate in 822 parts of water is added. After stirring for a short period, the mixture is slowly heated to 100° C. A solution of 80 parts of strontium nitrate in 500 parts of water is then added at the boiling point and after a short period the mixture is cooled and the precipitated pigment is removed by filtration.

This pigment may be used as such or further conditioned by various conditioning and end treating processes. For certain purposes when the coupling is completed, the conversion to the metallic salt may be carried out in the presence of wood rosin. Thus, in the above preparation, after the coupling is substantially complete, a wood rosin solution is added prior to the addition of the calcium chloride. A suitable wood rosin solution is prepared by adding 14 parts of sodium hydroxide as a 30% solution to 70 parts of wood rosin (abietic acid) to 1734 parts of water and heating at the boiling point with stirring. Similarly, the pigment may be end-treated with an aluminum salt to improve the pigment properties. Thus, basic aluminum acetate (preparable by slurrying 18.5 parts of dry aluminum hydrate and 18 parts glacial acetic acid in 90 parts water) is added to the final pigment-water suspension produced in Example 1 prior to the filtration step, and the mixture is held at 75° C. for 40 minutes. The pigment is isolated by filtration, washed chloride-free and dried at 80° C. giving a solid pigment of improved properties.

A different method of improving the pigment of Example 1 involves treating a suspension of the pigment in the form of the calcium salt prepared by a procedure described above, by simultaneously adding a solution of 15 parts of aluminum chloride in 650 parts of water and a solution of 3 parts of sodium hydroxide in 319 parts of water, the pigment suspension being held at a temperature of 75° C. for a short period (about ½ hour). The solid material is isolated by filtration, washed chloride-free and dried at 80° C. giving a solid pigment of improved properties.

Still another method of end-treating the pigment involves adding to the pigment suspension in the form of the calcium salt, slowly heated to 100° C. and held at 100° C. for ½ hour, fifteen parts of aluminum chloride in 650 parts of water. The thus-treated pigment suspension is held at 75° C. for 45 minutes in a pH range of 6.0–7.0 and the solid material is then isolated by filtration, washed chloride-free and dried at 80° C., giving a solid pigment of improved properties.

Example 2

Using the procedure described in Example 1, the diazo of 2-naphthylamine-1-methylsulfonic acid is coupled with BON to give an aqueous suspension. After an additional stirring period, a solution of 315 parts barium chloride crystals and 7.5 parts strontium nitrate in 1250 parts of water is added. After stirring for a short period, the mixture is slowly heated to 100° C., a solution of 80 parts of strontium nitrate in 500 parts of water is added, and, after a short period, the mixture is cooled and the precipitated pigment removed by filtration.

This pigment may be further conditioned by various conditioning and end-treating processes. For certain purposes, after the coupling is complete, the conversion to the metallic salt may be carried out in the presence of wood rosin. Thus, in the above preparation, after the coupling step, a wood rosin solution is added prior to the addition of the barium chloride. A suitable wood rosin solution is prepared by adding 14 parts of sodium as a 30% solution to 70 parts of wood rosin (abietic acid) to 1734 parts of water and heating at a boiling point with stirring.

The pigment may be given one of the following end-treatments:

(A) To a suspension of the pigment in the form of the barium salt prepared by a procedure of Example 2 prior to isolation of the pigment, there are added simultaneously a solution of 15 parts aluminum chloride in 650 parts of water and a solution 3 parts sodium hydroxide in 319 parts of water, the pigment suspension being at a temperature of 75° C. The thus-treated mixture is held at 75° C. for a short period (about ½ hour) and the solid material is then isolated by filtration, washed chloride-free and dried at 80° C., giving a solid pigment.

(B) The pigment suspension of Example 2 in the form of the barium salt is slowly heated to 90° C. and is held at 90° C. for 10 minutes. The heated treated pigment suspension is adjusted in temperature to 80° C. by adding water. To the pigment suspension at 80° C. is added simultaneously a solution of zinc acetate prepared by slurrying 38 parts zinc oxide and 60 parts glacial acetic acid and a wood rosin solution prepared by dissolving 250 parts wood rosin in 46 parts of caustic soda and 5000 parts of water. The thus-treated mixture mixture is held at 80° C. for 15 minutes at a pH of 6.5–7.5 and solid material is then isolated by filtration, washed chloride-free and dried at 80° C. giving the desired solid pigment.

Example 3

The strontium salt of Formula I is prepared according to the procedure of Example 1, except that 275 parts of strontium nitrate dissolved in 1250 parts of water is substituted for the calcium chloride used therein.

Example 4

The manganese salt is prepared according to the procedure of Example 1 except that 290 parts of manganese sulfate dissolved in 1250 parts of water is substituted for the 190 parts of calcium chloride used therein.

Example 5

A pigment is prepared according to the procedure of Example 1 except that 105 parts of BN (beta-naphthol) are substituted for 135 parts of BON used therein.

Example 6

The barium salt of the azo formed from beta-naphthol is prepared according to the procedure of Example 2 except that 105 parts of beta-naphthol (BN) is substituted for 135 parts of beta-hydroxy-naphthoic acid used therein.

Example 7

The strontium salt of the azo compound obtained from beta-naphthol is prepared according to the procedure of Example 3 except that 105 parts of beta-naphthol is substituted for 135 parts of beta-hydroxy-naphthoic acid.

Example 8

The manganese salt is prepared according to the procedure of Example 4 except that 105 parts of beta-naphthol is substituted for 135 parts beta-hydroxy-naphthoic acid.

Example 9

To a solution of 31 parts of sodium hydroxide in 1361 parts of water is added 160 parts of 2-naphthylamine-1-methyl sulfonic acid. After stirring at 25° C. until solution is complete, ice is added to bring the temperature to 0° C., bringing the total mixture to 4242 parts. Then an aqueous solution of 46.5 parts of sodium nitrite is added followed by 68 parts of hydrochloric acid. The diazotization is complete by continuing to stir at 0° C.

A solution of beta-hydroxy-naphthoic acid (BON) is also prepared. For this purpose, 135 parts of beta-hydroxy-naphthoic acid (BON) is added to 74 parts of sodium hydroxide in 3068 parts of water. After stirring at 25° C. until solution is complete a small amount of dispersing agent is added and the solution is then made up to a total of 6543 by the addition of ice, bringing the temperature to 0° C.

The above diazo suspension is then added rapidly to the beta-hydroxy-naphthoic acid solution and the mixture is stirred at aout 0° C. until coupling is complete.

After an additional stirring period, a solution of 195 parts calcium chloride in 1000 parts of water is added. After stirring for a short period, the mixture is slowly heated to 100° C. and is held at 100° C. for 10 minutes. The pigment suspension is cooled to 75° C. with water and the solid material is then isolated by filtration, washed chloride-free and dried at 80° C. giving the calcium salt of the compound of Formula I as a solid pigment.

Example 10

The barium salt is prepared according to the procedure of Example 9 except that 330 parts of barium chloride dissolved in 1250 parts of water is substituted for the 195 parts calcium chloride used therein.

Example 11

The strontium salt is prepared according to the procedure for Example 9 except that 290 parts of strontium nitrate dissolved in 1250 parts of water is substituted for the 195 parts calcium chloride.

Example 12

The manganese salt is prepared according to the procedure for Example 9 except that 310 parts of manganese sulfate dissolved in 1250 parts of water is substituted for the 195 parts calcium chloride.

Example 13

The calcium salt of the azo compound resulting from beta-naphthol is prepared according to the procedure of Example 9 except that 105 parts beta-naphthol is substituted for 135 parts of beta-hydroxy-naphthoic acid used therein.

Example 14

The barium salt of the azo compound resulting from the coupling of beta-naphthol is prepared according to the procedure of Example 10 except that 105 parts beta-naphthol is substituted for 135 parts of beta-hydroxy-naphthoic acid used therein.

Example 15

The strontium salt corresponding to the salt of Example 11 is prepared according to the procedure of Example 11 except that 105 parts of beta-naphthol is substituted for 135 parts of beta-hydroxy-naphthoic acid used therein.

Example 16

The manganese salt of the azo compound resulting from beta-naphthol is prepared according to the procedure of Example 12 except that 105 parts of beta-naphthol is substituted for 135 parts of beta-hydroxy-naphthoic acid used therein.

Example 17

The products of the foregoing examples dispersed by using 1 part of pigment and 2 parts of transparent lithographic varnish containing .08 part of cobalt drier, were mulled on a Hoover Muller with 150 lb. pressure. Tints were prepared by using 80 parts of zinc oxide paste to 1 part of colored pigment paste.

Comparisons were then made of the BON couplings against the corresponding BN couplings by observations on masstone, undertone, overtone, tint share, transparency, and tint strength.

TABLE I

Evaluation Based Upon Salt of Azo Compound Derived from beta-Naphthol Used as the Standard of Comparison

| Product of Ex. No. | Description | Masstone | Undertone | Overtone | Tint shade | Transparency | Tint strength, percent (vs. BN coupling as 100%) |
|---|---|---|---|---|---|---|---|
| 1 | Ca (rosinated) | Much darker and brighter. | Very much bluer and cleaner. | Very much bluer and cleaner. | Very much bluer and cleaner. | Much more transparency. | 200 |
| 2 | Ba (rosinated) | Very much darker and brighter. | ----do---- | ----do---- | ----do---- | Very much more transparency. | 200 |
| 3 | Sr (rosinated) | ----do---- | ----do---- | ----do---- | ----do---- | ----do---- | 200 |
| 4 | Mn* (rosinated) | ----do---- | Very much bluer | Very much bluer | Very much bluer | ----do---- | 100 |
| 9 | Ca (non-rosinated) | Very much darker and slightly brighter. | Very much bluer and cleaner. | Very much bluer and cleaner. | Very much bluer and cleaner. | ----do---- | 200 |
| 10 | Ba (non-rosinated) | Very much darker and brighter. | ----do---- | ----do---- | ----do---- | ----do---- | 180 |
| 11 | Sr (non-rosinated) | ----do---- | ----do---- | ----do---- | ----do---- | ----do---- | 200 |
| 12 | Mn* (non-rosinated) | Very much darker and duller. | Very much bluer and duller. | Very much bluer and duller. | ----do---- | Moderately less transparent. | 100 |

*Not this invention, for comparison only.

The results shown in Table I indicate the superiority of the pigments based upon BON over those based on BN and also the superiority of the calcium, barium and strontium salts of this invention over the manganese salt.

Example 18

A pigment is prepared, according to the procedure of Example 1, except that the wood rosin solution was added to the BON solution before chilling with ice, and the coupling conducted in the presence of the sodium salt of wood rosin.

The conditioned pigment can be used in conventional ink formulations. Standard textbooks which present many such inks include:

Ink Technology for Printers and Students, E. A. Apps, Chemical Publishing Co., N.Y., 1964.

Printing Ink Manual, F. A. Askew, editor, Heffer & Sons, Cambridge, England, second edition, 1969.

Kirk-Othmer, Encyclopedia of Chemical Technology, Interscience, New York 1966, vol. 11, pp. 611 to 632 under "Printing Inks."

Example 19

The products of Example 17, where diluted with zinc oxide paste as there described, to give a desired intensity of color, are used as a lithographic ink. The superior strength of the pigment from Examples 1, 2, 3 and 9, 10 and 11 in actual printing on a lithographic press is as to be expected from the results shown in the drawdowns of Example 17.

Example 20

Type C rotogravure ink.—The pigments from Examples 1, 2 and 3 were made up in a standard type C composite vehicle of the following composition:

| | Grams |
|---|---|
| Amberol 801-p resin | 36.0 |
| Hercolyl resin | 10.0 |
| RS nitrocellulose 25% solution in 95% ethanol (United Lacquer) | 31.2 |
| Isopropyl acetate | 56.2 |
| Butyl acetate | 10.0 |
| Toluene | 36.2 | by milling 20 grams of each pigment with 180 grams of the above described composite vehicle and 1,000 grams of ¼ inch steel balls, the milling being effected by rolling the mixture of a 16 ounce mill 20 hours at 88 revolutions per minute.

The resulting inks give good results in rotogravure printing. The intensity of color can be controlled by the quantity of ink used, or by mixing with other pigments or by adding additional solvents to dilute to a desired color intensity, in accordance with conventional practice.

I claim:

1. An ink formulation comprising a vehicle and dispersed therein as a colorant therefor a maroon pigment having the formula:

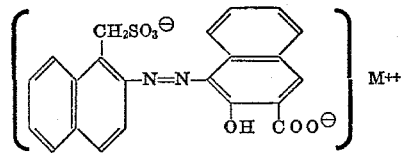

wherein M is a cation of calcium, barium or strontium.

2. The ink formulation of claim 1 in which the pigment particles are coated with, as a conditioning coating, a wood rosin salt.

3. The ink formulation of claim 2 in which the wood rosin is present as a salt with a cation of aluminum, sodium or M as above defined.

4. The ink formulation of claim 3 in which the pigment is present as mixture of calcium and strontium salts.

References Cited

UNITED STATES PATENTS

| | | | |
|---|---|---|---|
| 695,811 | 3/1902 | Julius et al. | 260—195 |
| 858,065 | 6/1907 | Ernst et al. | 260—195 |
| 1,016,307 | 2/1912 | Wagner et al. | 260—195 |
| 2,772,983 | 12/1956 | Grimm et al. | 106—22 |
| 3,086,872 | 4/1963 | Locke et al. | 106—22 X |
| 3,520,870 | 7/1970 | Dombroski et al. | 106—23 X |

JOAN B. EVANS, Primary Examiner

U.S. Cl. X.R.

106—241; 260—37 NP